United States Patent
Brunn et al.

(10) Patent No.: US 10,176,385 B2
(45) Date of Patent: Jan. 8, 2019

(54) CONTROL DEVICE FOR A VEHICLE AND METHOD

(71) Applicant: Conti Temic microelectronic GmbH, Nürnberg (DE)

(72) Inventors: Marcus Brunn, Waldburg (DE); Alexander Fischer, Ulm (DE); Alexander Manz, Ulm (DE); Matthias Mutschler, Ulm (DE); Patrick Schillinger, Ulm (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 217 days.

(21) Appl. No.: 15/166,878

(22) Filed: May 27, 2016

(65) Prior Publication Data

US 2016/0347235 A1 Dec. 1, 2016

(30) Foreign Application Priority Data

May 29, 2015 (DE) .................... 10 2015 209 983

(51) Int. Cl.
*H04N 7/18* (2006.01)
*G06K 9/00* (2006.01)
*B60Q 11/00* (2006.01)

(52) U.S. Cl.
CPC ........ *G06K 9/00791* (2013.01); *B60Q 11/005* (2013.01)

(58) Field of Classification Search
CPC .................. B60Q 11/005; G06K 9/00791
See application file for complete search history.

(56) References Cited

U.S. PATENT DOCUMENTS

| 2005/0152581 | A1* | 7/2005 | Hoki | B60Q 1/085 |
| | | | | 382/104 |
| 2007/0023613 | A1* | 2/2007 | Schofield | B60Q 1/1423 |
| | | | | 250/208.1 |
| 2007/0262882 | A1* | 11/2007 | Yamamoto | B60Q 1/1423 |
| | | | | 340/933 |
| 2016/0110620 | A1 | 4/2016 | Botusescu | |

FOREIGN PATENT DOCUMENTS

| DE | 102013104335 | 10/2014 |
| DE | 102013110840 | 4/2015 |

OTHER PUBLICATIONS

German Search Report for German Application No. 10 2015 209 983.0 dated Apr. 18, 2016, including partial translation.

* cited by examiner

*Primary Examiner* — Dakshesh D Parikh
*Assistant Examiner* — Peet Dhillon
(74) *Attorney, Agent, or Firm* — RatnerPrestia

(57) ABSTRACT

A control device and method for a vehicle with a light which is designed to illuminate an area in front of the vehicle, including an image capturing device, which is designed to capture image data for an area in front of the vehicle which is illuminated by the light in a switched-on state, and to output the image data, and including a calculation device, which is coupled to the image capturing device and is designed to calculate from the image data a light color that the light emits, and output it.

19 Claims, 2 Drawing Sheets

CONTROL DEVICE FOR A VEHICLE AND METHOD

CROSS REFERENCE TO RELATED APPLICATIONS

This application claims priority to German Patent Application No. 10 2015 209 983.0, filed May 29, 2015, the contents of such application being incorporated by reference herein.

FIELD OF THE INVENTION

The present invention relates to a control device for a vehicle and a method for determining a light colour.

BACKGROUND OF THE INVENTION

In modern vehicles a plurality of driver assistance systems can support the driver whilst driving the vehicle. Driver assistance systems can range from providing simple information for the driver, for example lane changing assistance, to systems which control the vehicle autonomously.

In order to carry out the respective functions many driver assistance systems require information about the surroundings of the vehicle. This information is usually obtained by different types of sensors. For example, imaging sensors, for example cameras, can be used for capturing the surroundings of the vehicle.

Particularly at night, the images captured by the cameras are very dependent on the lighting used. This makes it more difficult to evaluate the data captured by the cameras in driver assistance systems.

SUMMARY OF THE INVENTION

Therefore, one aspect the present invention provides better information about the vehicle lighting.

Accordingly:

a control device is provided for a vehicle with a light which is designed to illuminate an area in front of the vehicle, comprising an image capturing device which is designed to capture image data for an area in front of the vehicle which is illuminated by the light in a switched-on state, and to output the image data, and comprising a calculation device which is coupled to the image capturing device and is designed to calculate from the image data a light colour which the light emits, and output it.

Furthermore:

a method is provided for determining a light colour for a vehicle with a light which is designed to illuminate an area in front of the vehicle, comprising capturing image data for an area in front of the vehicle which is illuminated by the light in a switched-on state, calculating a light colour which the light emits based on reflecting surfaces and/or reflecting objects captured by the image data, and outputting the calculated light colour.

An aspect of the present invention is based on the finding that it is advantageous for the evaluation of image data to provide information about the lighting of the areas captured by an image capturing device.

The underlying concept of an aspect of the present invention takes this finding into account and makes it possible to provide driver assistance systems in a vehicle for example with information about at least the colour of light emitted by a light of a vehicle. A light of a vehicle is understood to refer to the lights that are used in the vehicle in order to illuminate the area of road in front of the vehicle. The latter can be for example the front headlights, i.e. the dipped beam and the main beam. The light colour characterises the colour appearance or the spectral composition of light emitted by the light. For example, the light of halogen lamps can have a higher red component than the light of xenon lights. For example, to the human observer a setting illuminated by a halogen lamp thus appears redder than a setting illuminated by a xenon lamp.

According to an aspect of the present invention an area in front of the vehicle or an area which is illuminated by the light is captured by means of an image capturing device, for example a camera or other image sensor, and corresponding image data are output. From the image data a calculation device calculates the colour of the light and provides information about the light colour, for example to additional control devices or driver assistance systems.

Depending on their function the driver assistance systems can perform an object or road marking identification for example. The algorithms used for recognising the objects and road markings can use information about the light colour in order to optimise the identification. For example knowing the light colour simplifies the recognition of coloured road signs as the colours in the image data can be identified clearly.

Advantageous embodiments and developments are described in the subclaims and the description with reference to the Figures.

In one embodiment the calculation device can be designed to identify reflecting surfaces and/or reflecting objects, in particular white reflecting surfaces and/or reflecting objects, in the image data and to calculate the light colour based on the reflecting surfaces and/or reflecting objects. White reflecting surfaces reflect essentially all of the spectral components of the incidental light. Thus the light colour can be determined very easily if only those image data are used which correspond to white reflecting surfaces and/or reflecting objects. If the image data are provided as RGB data (red, green, blue data) for example, from the values for the colours red, green and blue of a white reflecting surface it is possible to determine the light colour of the light directly. With a completely white light all three colours, RGB, have the maximum value. In a light with a higher red component, for example halogen light, the colour value for red is greater than the colour values for green and blue. With a blue light, for example a xenon light, the blue component is greater. Reflecting surfaces and/or reflecting objects are in particular surfaces and objects which reflect back a portion of the incidental light.

If reflecting surfaces and/or reflecting objects are used for determining the light colour, first of all their colour can be determined. After this the image data can be processed on the basis of the identified colour.

In a further embodiment however, also random objects, for example also non-mirroring surfaces and/or non-mirroring objects in the image data can be used to determine the light colour. Possible objects which can be used for determining the light colour are for example illuminated road surfaces, illuminated crash barriers, illuminated lane markings, illuminated walls, illuminated fog or snow or the like.

In a further embodiment the calculation device can be designed to identify lights, in particular the rear lights of other vehicles, in the image data and to exclude the latter from the calculation of the light colour. As lights have a separate light source they are unsuitable for determining the colour of the lighting of the vehicle.

In one embodiment the calculation device can be designed to calculate the light colour on the basis of an intensity and/or a profile of the intensity and/or a position and/or a colour image of the reflecting surfaces and/or reflecting objects in the image data.

In one embodiment the calculation device can be designed to cut out areas from the image data which comprise the reflecting surfaces and/or reflecting objects on the basis of the position of the reflecting surfaces and/or reflecting objects. These areas of the image data thus represent colour images of the individual reflecting surfaces and/or reflecting objects. For example, the light colour can be determined based on an averaged light colour from a plurality of cut-out areas. In this way, it is possible to determine the light colour very easily.

In one embodiment the calculation device can be designed to normalise the image data on the basis of the calculated light colour, and output them. For example, from the calculated light colour for each main colour, for example red, green, blue, a normalisation factor can be calculated. The image data are then multiplied for each main colour individually by the corresponding factor. Even though in this patent application the main colours red, green and blue are given by way of example other colours than the RGB spectrum can also be used, for example the CMYK spectrum.

In one embodiment the calculation device can be designed to determine a type of light source used in the light on the basis of the calculated light colour. As each light source has a characteristic light colour, the light source used can be determined from the light colour. The driver assistance system can then simply be given information about the light source used. The latter can then perform a corresponding normalisation or evaluation of the image data independently. Alternatively, this information can also be used for example to show a driver that he has used the incorrect light source in a headlight.

In one embodiment the calculation device can be designed to calculate a deviation between an average intensity of the reflecting surfaces and/or reflecting objects in predefined areas of the image data and between intensities predefined for the areas, and to emit a warning signal when the deviation lies above a predefined threshold. By analysing the intensity of the reflections caused by the reflecting surfaces and/or reflecting objects it is possible to check whether individual areas are being lit as expected. For example the light distribution in vehicles in right-hand traffic is usually adjusted so that the dipped beam is stronger on the right side than on the left side. With this information it is possible to determine the expected intensity in the different regions of the image data. If for example the reflections in the left area in front of the vehicle are too dark this may indicate that the left headlight has failed. If the reflections in the right area in front of the vehicle are slightly darker but the road signs are too bright, this may indicate that the right headlight is adjusted to be too high.

The above configurations and developments can be combined with one another as desired, as long as this is practical. Additional possible embodiments, developments and implementations of the invention also include not explicitly defined combinations of features of the invention described above or in the following with respect to the embodiments. In particular, a person skilled in the art would also add individual aspects to make improvements or additions to the basic form of the present invention.

BRIEF DESCRIPTION OF THE DRAWINGS

The present invention is explained in more detail in the following with reference to the example embodiments shown in the schematic figures of the drawings. In the latter.

In all of the Figures the same or functionally identical elements and devices are denoted by the same reference numerals—unless otherwise indicated.

DETAILED DESCRIPTION OF THE PREFERRED EMBODIMENTS

Figure 1:
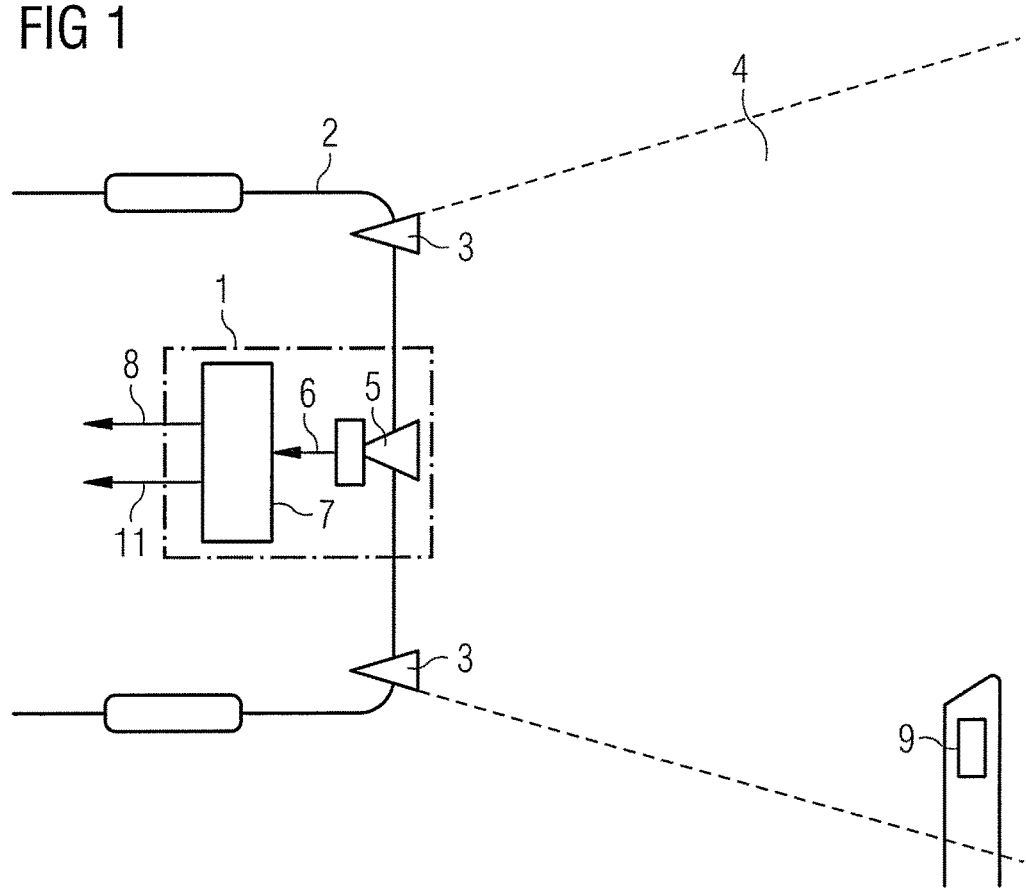
FIG. 1 shows a block diagram of an embodiment of a control device according to the invention.

FIG. 1 shows a block diagram of an embodiment of a control device 1 according to the invention which is arranged in a vehicle 2. The vehicle 2 comprises a light 3 which illuminates an area 4 in front of the vehicle.

The control device 1 comprises an image capturing device 5 which captures image data 6 for the illuminated area 4 or at least a section of the illuminated area 4 in front of the vehicle 2. The image capturing device 5 outputs the image data 6 to a calculation device 7. The latter calculates from the image data 6 a light colour 8 which the light 3 emits and outputs information about the calculated light colour 8. FIG. 1 shows by way of example in front of the vehicle 2 a road boundary post with a reflector 9 as the reflecting surface 9. Of course, in real applications a plurality of reflecting surfaces and reflecting objects can be evaluated.

Information about the light colour 8 can be used for example by additional vehicle control devices or driver assistance systems of the vehicle 2 in order to calibrate image processing algorithms or the like. From the light colour 8 the calculation device 7 can also determine the type of light source used. In the vehicle 2 for example halogen lights, xenon lights, LED lights or the like can be used which each have characteristic light colours 8. Information about the light source used can be stored centrally in the vehicle 2 for example and queried by the driver assistance systems.

Lastly, the calculation device 7 can also calculate a deviation between an average intensity of the reflecting surfaces 9 and/or reflecting objects in predefined areas of the image data 6 and between intensities predefined respectively for the areas. Such a deviation is characteristic of possibly defective or incorrectly adjusted headlights in the vehicle. If the deviation exceeds a predefined threshold, the calculation device 7 therefore emits a warning signal 11.

Figure 2:
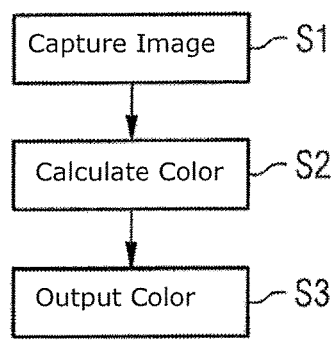
FIG. 2 shows a flow chart of an embodiment of a method according to the invention.

FIG. 2 shows a flow chart of an embodiment of a method according to the invention for determining a light colour 8. The method can be used in particular in vehicles 2 which have a light 3 for illuminating an area 4 in front of the vehicle 2. The information about the light colour 8 can be used for example by driver assistance systems in the vehicle to adjust the image processing or the parameters of the used image processing algorithms accordingly.

The method includes capturing, S1, image data 6 for the area 4 or at least a part of the area 4 in front of the vehicle 2. The image data 6 are captured when the light 3 of the vehicle 2 is switched on. The image data 6 are for example the data 6 of an image taken by a camera 5 for example.

From the image data 6 the light colour 8 that the light 3 emits is calculated, S2. For this, reflecting surfaces 9 and/or reflecting objects are identified and the image data for these reflecting surfaces 9 and/or reflecting objects are analysed. Reflecting surfaces 9 or reflecting objects can be all objects in the area 4. In particular, the reflecting surfaces 9 or reflecting objects can be for example reflectors on the roadside or reflecting segments of road signs. The calculated light colour 8 is lastly output, S3, for example to driver assistance systems of the vehicle 2.

Figure 3:
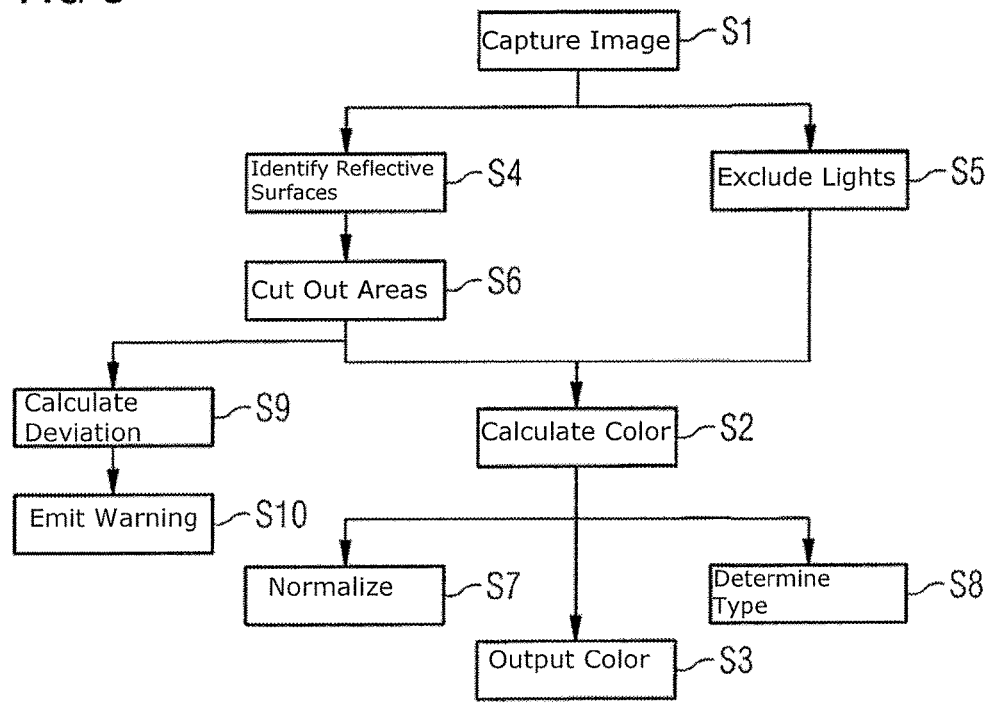
FIG. 3 shows a flow chart of a further embodiment of a method according to the invention.

FIG. 3 shows a flow chart of a further embodiment of a method according to the invention, which is based on the method of FIG. 2.

The method of FIG. 3 includes additional steps prior to calculating, S2, the light colour 8. Thus the reflecting surfaces 9 or the reflecting objects in the image data 6 are identified, S4. In particular, for example white reflecting surfaces 9 or reflecting objects can be identified. For this, suitable image processing algorithms can be used. For example, brightness gradients in the image data 6 can be evaluated. Based on the position of the reflecting surfaces 9 or the reflecting objects, areas are cut out, S6, from the image data 6 which comprise the reflecting surfaces 9 or the reflecting objects. The light colour 8 is then calculated, S2, on the basis of an average light colour 8 from a plurality of cut-out areas.

Prior to calculating, S2, the light colour 8, lights, in particular for example the rear lights of other vehicles, can be identified in the image data 6 and can be excluded, S5, from the calculation of the light colour 8. This can be performed for example using the position of the identified lights. The lights of vehicles are always arranged in the vehicle body and surrounded by the latter. Such an arrangement can be identified for example by using suitable image identification algorithms. In this way it is possible to prevent the lights of other vehicles from affecting the calculation of the light colour 8.

Once the light colour 8 has been calculated in S2, the image data 6 are normalised using the light colour 6 in S7 and output. Furthermore, in S8 the type of light source used in the light is determined and output.

Parallel to determining the light colour according to the present method a deviation is calculated, S9, between an average intensity of the reflecting surfaces 9 or the reflecting objects in predefined areas of the image data 6 and between intensities predefined respectively for the areas. This enables a comparison between the actually produced light image or the actual illumination of the area 4 and an expected light image or an expected illumination. If the deviation exceeds a predefined threshold a warning signal 11 is emitted, S10.

Although the present invention has been described above with reference to preferred example embodiments, it is not restricted to the latter, but can be modified in many different ways. In particular, the invention can be changed or modified in various ways, without deviating from the basic concept of the invention.

REFERENCE NUMERALS 1 control device
2 vehicle
3 light
4 area
5 image capturing device
6 image data
7 calculation device
8 light colour
9 reflecting surface
11 warning signal
S1-S10 method steps

The invention claimed is:

1. A control device for a vehicle with a light, which is designed to illuminate an area in front of the vehicle, comprising:
    an image capturing device in the vehicle, to capture image data for an area in front of the vehicle which is illuminated by the light in a switched-on state; and
    a calculation device in the vehicle which is coupled to the image capturing device and calculates from the image data a light colour that the light emits, and
    wherein the calculation device calculates a deviation between an average intensity of the reflecting surfaces and/or reflecting objects in predefined areas of the image data and between predefined intensities, and the control device controls the vehicle when the deviation is above a predefined threshold.

2. The control device according to claim 1, wherein the calculation device identifies reflecting surfaces and/or reflecting objects in the image data, and calculates the light colour on the basis of the reflecting surfaces and/or reflecting objects.

3. The control device according to claim 1, wherein the calculation device identifies lights in the image data, and excludes the lights from the calculation of the light colour.

4. The control device according to claim 2, wherein the calculation device calculates the light colour on the basis of at least one of an intensity, a profile of the intensity, a position, a colour image of the reflecting surfaces, and reflecting objects in the image data.

5. The control device according to claim 4, wherein the calculation device selects areas from the image data which comprise the reflecting surfaces and/or reflecting objects on the basis of the position of the reflecting surfaces and/or reflecting objects, and to determine the light colour on the basis of an averaged light colour from a plurality of selected areas.

6. The control device according to claim 1, wherein the calculation device normalizes the image data on the basis of the calculated light colour.

7. The control device according to claim 1, wherein the calculation device determines a type of light source used in the light.

8. The control device according to claim 1, wherein the control device emits a warning signal if the deviation is above a predefined threshold.

9. A method for determining a light colour for a vehicle with a light, which is designed to illuminate an area in front of the vehicle, comprising:
    capturing, by an image capturing device in the vehicle, image data for an area in front of the vehicle, which is illuminated by the light in a switched-on state; and
    calculating, by a calculation device in the vehicle, a light colour that the light emits on the basis of reflecting surfaces and/or reflecting objects captured by the image data, and
    wherein the calculation device calculates a deviation between an average intensity of the reflecting surfaces and/or reflecting objects in predefined areas of the image data and between predefined intensities, and a control device in the vehicle controls the vehicle when the deviation is above a predefined threshold.

10. The method according to claim 9, wherein the reflecting surfaces (9) and/or reflecting objects are identified in the image data, and/or wherein lights are identified in the image data and excluded (S5) from the calculation of the light colour.

11. The method according to claim 10, wherein the light colour is calculated on the basis of at least one of an intensity, a profile of the intensity, a position, a colour image of the reflecting surfaces, and reflecting objects in the image data; and wherein on the basis of the position of the reflecting surfaces and/or reflecting objects, areas are selected from the image data which comprise the reflecting surfaces and/or reflecting objects, and the light colour is calculated on the basis of an averaged light colour from a plurality of selected areas.

12. The method according to claim 9, wherein the image data are normalised on the basis of the calculated light colour.

13. The method according to claim 9, wherein the type of light source used in the light is determined.

14. The method according to claim 9, emitting a warning signal if the deviation is above a predefined threshold.

15. The control device according to claim 1, wherein the calculation device is designed to identify reflecting surfaces and/or reflecting objects, in particular white reflecting surfaces and/or reflecting objects, in the image data, and to calculate the light colour on the basis of the reflecting surfaces and/or reflecting objects.

16. The method according to claim 15, wherein the white reflecting surfaces and/or reflecting objects, are identified in the image data, and/or wherein rear lights of other vehicles, are identified in the image data and excluded from the calculation of the light colour.

17. The control device according to claim 2, wherein the calculation device identifies rear lights of other vehicles in the image data and excludes the rear lights from the calculation of the light colour.

18. The control device according to claim 3, wherein the calculation device calculates the light colour on the basis of at least one of an intensity, a profile of the intensity, a position, a colour image of the reflecting surfaces, and reflecting objects in the image data.

19. The method according to claim 9, wherein the light colour is calculated on the basis of at least one of an intensity, a profile of the intensity, a position, a colour image of the reflecting surfaces, and reflecting objects in the image data; and wherein on the basis of the position of the reflecting surfaces and/or reflecting objects, areas are selected from the image data which comprise the reflecting surfaces and/or reflecting objects, and the light colour is calculated on the basis of an averaged light colour from a plurality of selected areas.

* * * * *